(12) United States Patent
Zuback et al.

(10) Patent No.: US 8,815,096 B2
(45) Date of Patent: Aug. 26, 2014

(54) SULFATE REMOVAL FROM WATER SOURCES

(75) Inventors: Joseph Edward Zuback, Camarillo, CA (US); Richard Woodling, Singapore (SG)

(73) Assignee: Siemens Aktiengesellschaft, München (DE)

( * ) Notice: Subject to any disclaimer, the term of this patent is extended or adjusted under 35 U.S.C. 154(b) by 895 days.

(21) Appl. No.: 12/936,143

(22) PCT Filed: Apr. 13, 2009

(86) PCT No.: PCT/US2009/002316
§ 371 (c)(1),
(2), (4) Date: Jan. 26, 2011

(87) PCT Pub. No.: WO2009/131635
PCT Pub. Date: Oct. 29, 2009

(65) Prior Publication Data
US 2011/0132839 A1   Jun. 9, 2011

Related U.S. Application Data

(60) Provisional application No. 61/044,702, filed on Apr. 14, 2008.

(51) Int. Cl.
| | |
|---|---|
| *B01D 15/04* | (2006.01) |
| *C02F 9/00* | (2006.01) |
| *C02F 1/42* | (2006.01) |
| *C02F 101/10* | (2006.01) |
| *C02F 1/00* | (2006.01) |
| *C02F 1/44* | (2006.01) |
| *C02F 103/10* | (2006.01) |
| *C02F 5/02* | (2006.01) |

(52) U.S. Cl.
CPC ............. *C02F 9/00* (2013.01); *C02F 2001/425* (2013.01); *C02F 2101/101* (2013.01); *C02F 1/001* (2013.01); *C02F 1/444* (2013.01); *C02F 2303/16* (2013.01); *C02F 1/441* (2013.01); *C02F 2103/10* (2013.01); *C02F 5/02* (2013.01)
USPC ........... 210/638; 210/202; 210/650; 210/652; 210/696; 210/749

(58) Field of Classification Search
USPC .................. 210/202, 638, 650, 652, 696, 749
See application file for complete search history.

(56) References Cited

U.S. PATENT DOCUMENTS

| | | |
|---|---|---|
| 3,350,292 A | 10/1967 | Weinberger |
| 3,639,231 A | 2/1972 | Bresler |
| 6,416,668 B1 | 7/2002 | Al-Samadi |
| 6,461,514 B1 | 10/2002 | Al-Samadi |
| 2005/0126999 A1 | 6/2005 | Rawson et al. |
| 2006/0060532 A1 | 3/2006 | Davis |
| 2007/0000837 A1 | 1/2007 | Davankov et al. |
| 2007/0045189 A1 | 3/2007 | Lichtner et al. |

*Primary Examiner* — Dirk Bass (57) ABSTRACT

An integrated process for removing sulfate from water sources, such as pretreated acid mine drainage (AMD). The multivalent cation (MVC) content of a sulfate stream is reduced by strong acid cation (SAC) ion exchange and sulfate is concentrated with a membrane system and separated as precipitate and overflow. Precipitation results from reaction of sulfate with MVC produced by regeneration of SAC with sodium chloride. The overflow is reacted with carbonate to precipitate MVC, generate sodium chloride and give a further overflow stream. This latter stream is concentrated to a level capable of being a regenerant for the SAC and when needed, used to regenerate the SAC and produce MVC for sulfate precipitation. The process minimizes the use of chemicals by treating, reconcentrating and recycling input species. Capital expenditures are minimized by precipitation of only side streams.

31 Claims, 5 Drawing Sheets

SULFATE REMOVAL FROM WATER SOURCES

CROSS REFERENCE TO RELATED APPLICATION AND PRIORITY CLAIM

This application claims the benefit under 35 U.S.C. §119 (e) of copending U.S. Provisional Application Ser. No. 61/044,702, entitled SULFATE REMOVAL SYSTEM filed on Apr. 14, 2008, which is hereby incorporated by reference in its entirety.

FIELD OF THE INVENTION

This invention relates to sulfate removal from water sources, and more particularly, to an integrated sulfate removal process for a contaminated water source wherein the process minimizes the use of chemicals by treating, reconcentrating and recycling input species.

BACKGROUND OF THE INVENTION

High concentrations of sulfates in water sources present problems to wetlands and their wildlife inhabitants. An example of great concern is the high level of sulfates entering the Everglades, which is reported to be 60 to 100 times normal background. Sulfates can stimulate microbial sulfate reduction (MSR) wherein sulfate reducing bacteria (SRB) produce sulfide from sulfate in the course of degrading inorganic matter and which controls the methylation and bioaccumulation of neurotoxic methyl mercury (MeHg) in the Everglades. MeHg is a potent neurotoxin that bioaccumulates in fish and other wildlife. Other deleterious effects of high levels of sulfates are the generation of hydrogen sulfide and the accelerated release of nitrogen and phosphorous from soils, termed autoeutrophication.

Acid mine drainage (AMD), sometimes referred to as Acid Rock Drainage, represents a large source of sulfate containing waters. Acid mine drainage (AMD) is low pH water arising from oxidation of iron and other sulfides to sulfuric acid. It is usually considered as water that flows from coal mines or mining waste or tailings, but can occur in metal mining, highway construction and other deep excavations. AMD is a common term sometimes used to refer to any mine operation discharge, many of which are alkaline.

The traditional treatment of AMD is with lime and limestone to neutralize acidity and precipitate out calcium sulfate (gypsum). However, relatively high levels of sulfate remain. Depending on composition and ionic strength, sulfate concentrations of about 1500 mg/l to up to 4000 mg/l, may remain after such treatments. Calcium content is also high due to the lime treatment, and there are other metal ions present as well.

Sulfate removal processes have been the subject of many studies.

A review of sulfate treatment processes are described in Chapter 3 of "Treatment of Sulphate in Mine Effluents", October 2003, a final report from International Network for Acid Prevention (INAP) Salt Lake City, Utah 84109 USA. Chemical, membrane ion exchange and biological mechanisms are described. The report may be found at http://www.inap.com.au/public_downloads/Research_-Projects/Treatment_of_Sulphate_in_Mine_Effluents_-_Lorax_Report.pdf U.S. Pat. No. 4,049,513 describes a process wherein lime softener water is brought through a line to an industrial process where dissolved solids are concentrated and sent to a reaction chamber. Calcium hydroxide is added to precipitate sulfate and provide excess calcium hydroxide in the overflow. The overflow is sent to a second reaction chamber where it is mixed with raw water and $CO_2$ or bicarbonate to precipitate calcium carbonate and provide a clear supernatant for the industrial process.

U.S. Pat. No. 6,790,352 describes process where untreated acid mine drainage enters Section I of the process where $Mg(OH)_2$ and high pH effluent from Section II are added. Precipitation of metal hydroxides ensue which are separated as a cake leaving a stream of "demetallized water." This stream is separated by tangential filtration into a purified water stream and sulfate ladened water. One portion of water from Section I is mixed with $Ca(OH)_2$ and enters Section II where there is produced a calcium sulfate cake and a high pH effluent. The high pH effluent is used as precipitating agent in Section I. The remaining portion of sulfate ladened water is mixed with ammonia to produce ammonia sulfate cake and aqueous ammonia.

Cost effective methods and apparatus are sought to reduce effluent concentrations of sulfate to below 500 mg/l, and more preferably below 250 mg/l. A useful guideline is that the EPA Secondary Drinking Water Regulations recommend a maximum concentration of 250 mg/l for sulfate ions. Many of the water sources generating AMD are located at remote sites, requiring compact and low energy usage systems. Furthermore, waste disposal has to be controlled to prevent despoiling natural resources.

Herein is described an integrated apparatus and process for removal of sulfates from water sources. In a particular use, sulfate is removed from Acid Mine Drainage (AMD) after preliminary lime and/or limestone treatment, or similar initial treatment to reduce sulfate content to below about 10,000 mg/l, more preferably to less than about 5000 mg/l concentration after initial treatment. Milligram per liter (mg/l), or parts per million (ppm) are standard measures of concentration. The process minimizes the use of chemicals by treating, reconcentrating and recycling input species. Capital expenditures are minimized by precipitation of only side streams.

DETAILED DESCRIPTION OF THE INVENTION

A novel integrated process and associated apparatus for removal of sulfate from a water source is described. Removal here means that water passing through the apparatus and continuing to downstream fate, for example, passing to a natural aqueduct or aquifer, has a greatly reduced sulfate content. As an exemplary example, the treatment of a water source resulting from lime and/or limestone treated AMD will be described, but should not be considered limiting, as those skilled in the art of water remediation will recognize that the apparatus and process described herein can be adapted to other sulfate containing waters.

Figure 1:
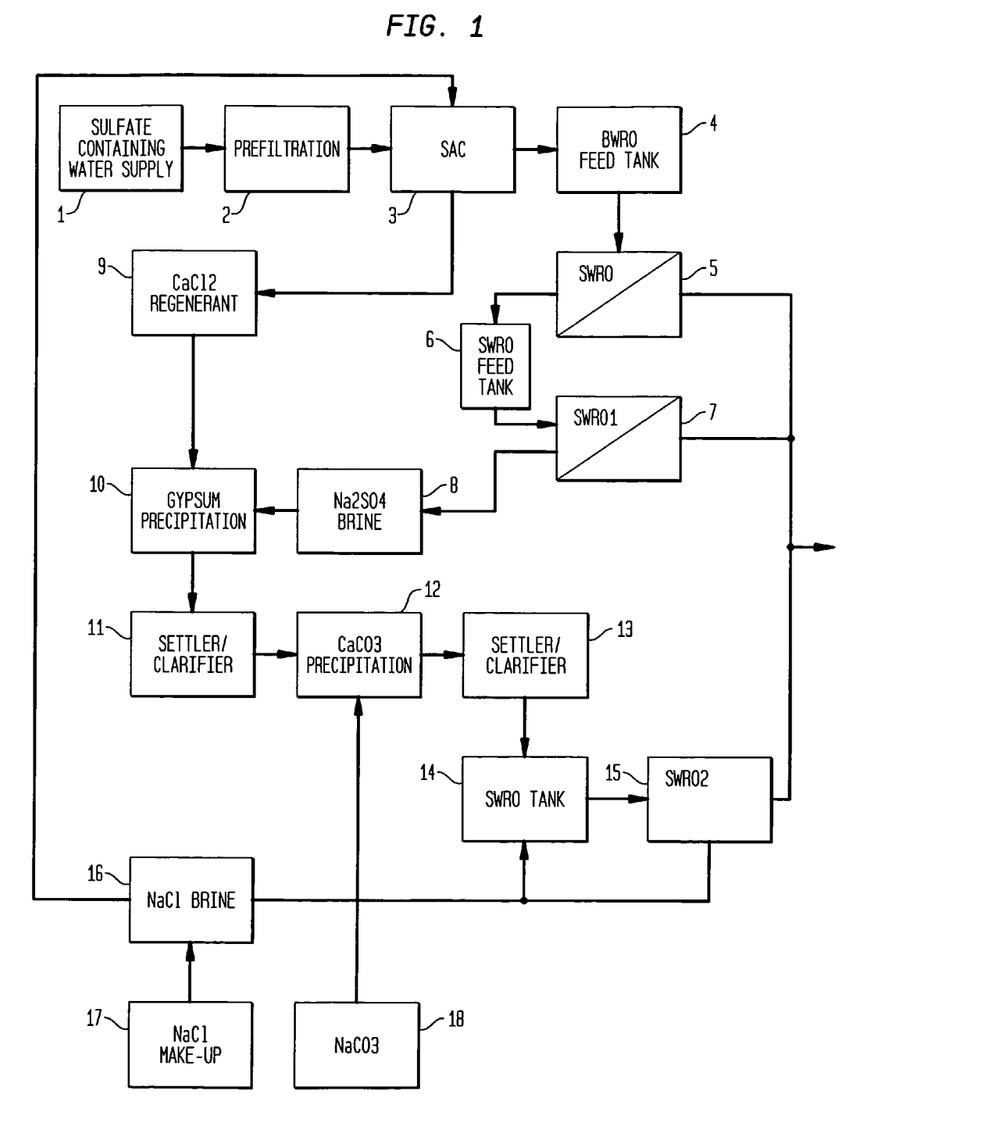
FIG. 1 illustrates the process outline of the current invention.

The following description refers to FIG. 1. Numbers in brackets refer to a specific process step or equipment Water to be treated is usually held in a lagoon, pond, storage tank or similar facility 1. Before entering the treatment process train, a prefiltration step 2 may used to protect the Strong Acid Cation 3 ion exchange (SAC) media by removing particles, organic matter, bacteria, and other contaminants. Slow sand filtration may be used. A more preferred method is dual media sand filtration. This method uses a layer of anthracite over a layer of fine sand. Other methods may be used singularly or in combination. These include, but are not limited to, mixed media filtration, non-woven fabric cartridge filtration, and membrane filtration.

Figure 2:
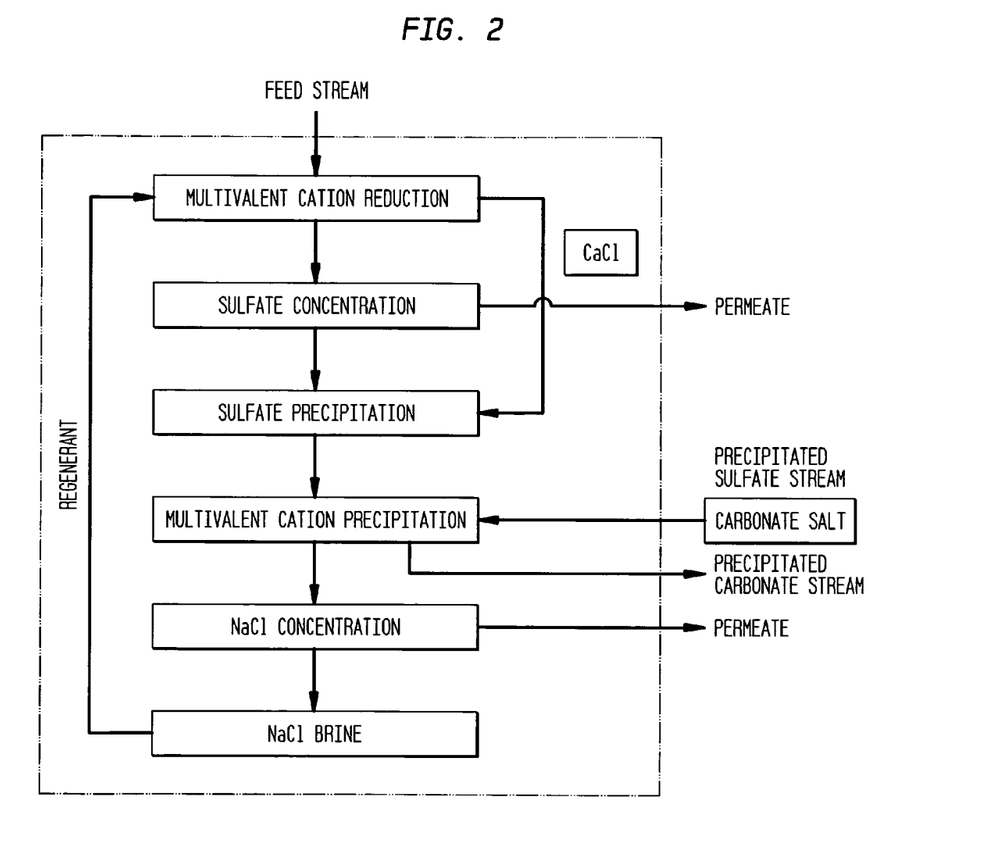
FIG. 2 is a simplified outline of the process.

The preferred process comprises a novel combination of ion exchange, reverse osmosis (RO) and precipitation to treat of high sulfate bearing streams. FIG. 2 shows an outline of the preferred process steps. In this process calcium is removed from the feed stream by SAC (strong acid cation) ion exchange resin and exchanged for the counterion of the SAC. A preferred counterion is sodium. The SAC step is followed by sulfate concentration using preferably a membrane separation process, more preferably, a reverse osmosis (RO) process. A descriptor of concentration is the ratio defined as the sulfate concentration going to the sulfate precipitation process step (described below) divided by the sulfate concentration of the stream leaving the SAC step. RO concentrate containing $Na_2SO_4$ is then mixed with spent regenerant ($CaCl_2$) to precipitate out gypsum ($CaSO_4$). A process step comprising carbonate precipitation in which sodium carbonate is added to the overflow stream of the gypsum precipitation step produces further reduction of calcium concentration. The effluent from carbonate precipitation is concentrated with an RO system producing a NaCl brine solution which is employed for regenerating the SAC ion exchange beds. The advantage of this process is that the use of chemicals is minimized by treating, reconcentrating and recycling regenerant after mixing with RO concentrate. The process also minimizes capital expenditure by precipitation of only side stream flows. An important attribute of the overall process is that each step contributes to improving the effectiveness of a subsequent step.

Practitioners of contaminated water remediation will recognize that other process steps may be substituted for the preferred steps. As examples, sulfate concentration may be done by evaporation methods or by electrodialysis membrane processes. Sulfate removal may be done by sulfate reducing bacteria in anaerobic packed bed reactors or by anion exchange resins. Sulfate has been shown removal by clinoptilolite dominated zeolites modified the quaternary amine hexadecyltrimethylammonium. Calcium and other multivalent cations are removed in a carbonate precipitation step, but this step may be done by SAC.

The prefiltered water feed stream enters the cation sorption step 3. Sorption is defined to mean that cations, more specifically multivalent cations are removed by adsorption, absorption or a combination of both. A preferred method is SAC ion exchange. SAC is commonly used for water demineralization of most cations including heavy metals. SAC may be accomplished by gel polystyrene sulphonate cation exchange resin or macroporous poly(styrene sulphonate) cation-exchange resin.

The purpose of the sorption step is multifold. The cation sorption step serves to remove the major portion of multivalent cations, primarily calcium, but including metal ions such as, but not limited to nickel, copper, zinc and molybdenum. Sorption removes calcium so that scaling will not occur in the subsequent concentration step, particularly if RO filtration is used. Scaling is a well known fouling mechanism for RO membrane filter systems wherebye material such as minerals, salts or organic matter settle and solidify on the process equipment surfaces and reduce effectiveness. In RO systems, scaling manifests a reduced productivity due to reduced permeation at constant pressure. By greatly reducing calcium content in the feed stream, the RO system can operate more efficiently by operating longer between cleaning cycles. The sorption step also concentrates calcium for use in gypsum precipitation, a key process step for sulfate removal. Calcium is recovered during the SAC regeneration, as will be described below. In addition, some metals are also recovered in the same step, and precipitated in a later step, where they can be collected and disposed of if necessary.

Sorption units can be arranged in parallel trains, with one train operational until it reaches a predetermined saturation limit, and then flow is switched to the parallel train. The exhausted train is regenerated or replaced. The sorption units can be arranged in a series, so that the later units sorb calcium leakage or breakthrough. Units may also be arranged in any useful combination of parallel and series.

Softener is also a term used for sorption units as described herein.

When ion exchange is used for the sorption step, the monovalent cation form of the ion exchange media is preferred. The effluent is then at about the same pH as the feed stream that entered the sorption step and is more easily filtered in the RO step(s) of the process. Sodium is a preferred monovalent cation. The effluent from the ion exchange step contains high proportion of sodium (or other monovalent) sulfate and a much reduced calcium content.

The effluent from the sorption step goes to an membrane filtration process, preferably a reverse osmosis (RO) process step. Reverse osmosis filtration is used to desalinate water using a semipermeable membrane at elevated pressure. Purified water passes through the membrane, i.e., the permeate, from the higher pressure side and dissolved entities, such ions, are retained on the high pressure side of the membrane, denoted as the concentrate or reject.

Reverse osmosis membranes can be supplied in a variety of properties. So-called seawater membranes are used to desalinate seawater (equivalent to approximately 35,000 ppm NaCl) at pressure of 800-1500 psi. This type of membrane will retain over 99% of incident salt. So-called brackish water membranes operate at lower pressures in waters of lower ionic strength. They will have relatively lower inherent retention of salt ions, but have a higher permeability and when properly engineered, will operate economically. Nanofiltration membranes are so-called "loose" reverse osmosis membranes which retain species of greater than about 400 molecular weight. They have relatively higher permeability than the previously described membranes.

The purpose of the RO process step is to concentrate sulfate and any residual calcium and other divalent metals from the sorption step while passing purified water to downstream fate. Recovery is defined for water flow as the permeate flow to the concentrate flow. For economy and ease of operation, the RO membranes are chosen to retain a high proportion of divalent cations and sulfate, and to pass some of the monovalent ions and water. The overall RO step can be engineered in a variety of conformations, depending on the amount of water to be processed, the feed concentrations and the required output. Reverse osmosis system design is the topic of several books, such as The Guidebook to Membrane Desalination Technology: Reverse Osmosis, Nanofiltration and Hybrid Systems Process, Design, Applications and Economics (Wilf, M., et al; Desalination Publications).

While practitioners commonly may use once through flow in reverse osmosis operations, practitioners also use concentrate recirculation, where the concentrate is returned to the feed storage tank. In relatively small applications, such as waste water, where intermittent or non-continuous discharge is used, a batch or semi-batch method is common. A batch operation is one in which the feed is collected and stored in a tank or other reservoir, and periodically treated. In semi-batch mode, the feed tank is refilled with the feed stream during operation.

The RO system may have single or multiple stages. In a single stage system, the feed passed through one or more pressure vessel arrange in parallel. Each pressure vessel will have one or more membrane modules in series. The number of stages is defined as the number of single stages the feed passes through before exiting the system. Permeate staged systems use permeate from the first stage as feed for the second stage, and if multiple stages are used, permeate from a stage just prior is used as feed for the following stage. In as reject staged system, the reject stream of a stage is sent to become the feed stream of a subsequent, usually the next, stage. Reject, concentrate and retentate and similar terms have synonymous meanings in RO processing In order to show a practical application of the process, a two stage RO system is described. This designed is not to be considered as a limiting case, but is presented to show a practical approach to this aspect of the integrated process. Effluent from the sorption step is collected in a RO storage tank 4. This is a convenient and practical method of controlling the feed to the RO system. It is possible that the effluent could be sent directly to the RO system if steps are taken to moderate flow irregularities. A filter for removal of SAC fines and other material that may foul the RO membranes may be interposed between the RO feed tank and the first stage of the RO system (not shown). This filter can be a cartridge filter of 1 to 25 micron rating, more preferably of 1 to 10 micron rating and most preferably less than 5 micron rating. The prefilter may be a non-cartridge filtration unit such as the dual media sand filters previously described. The prefilters may be membrane filters, either microporous or ultrafiltration. The practitioner will decide in each case based on the water quality of the feed stream, the economics of the operation and the practicality (for example, ease of use) of a method at the site location, with the given resources available.

The effluent from the SAC or sorption step is sent to a feed tank 4 to serve as feed for the first RO stage. This membrane of the first stage may be a brackish water membrane since the purpose is to retain sulfate, which at this point is primarily sodium sulfate, and any divalent cations. These species are more easily retained than monovalent ions, and a higher permeability membrane can be specified. Brackish water membranes are well suited for this operation as they operate at pressures of 200-400 psi, which reduces pumping capital costs. Retention of sulfate is over 95%, and up to greater than 99%.

In the first RO step 5, sulfate and divalent cations are concentrated in the retentate and the retentate is sent as feed to the second stage. The permeate from the first stage is essentially free of sulfate. Flow recovery of each stage is a function of feed concentration and potential type of scaling and/or fouling that may occur. Nominal recovery (Feed flow rate minus retentate flow rate/Feed flow rate)×100 is 80% or higher is desirable if practitioners are able to control scaling/fouling.

The retentate is sent to a feed tank for the second RO stage 6. Tanks 5 and 6 may be used for concentrate recycle in batch or semi-batch mode. The recycle rate will be adjusted to reduce fouling and scaling.

The retentate is further concentrated in the second stage. The RO membrane used in this stage may be a brackish membrane, but the higher ionic concentration may require a membrane with a higher inherent rejection capability. The higher ionic content may necessitate a lower recovery. The retentate from the second RO stage has high sodium sulfate content. The retentate is sent to a $Na_2SO_4$ brine tank 8.

The $Na_2SO_4$ is reacted in a reaction tank 10 with calcium chloride ($CaCl_2$) produced when the SAC columns are regenerated with sodium chloride (NaCl). The reaction results in the formation of gypsum ($CaSO_4$) and NaCl. The NaCl used to regenerate the SAC columns is primarily produced in this step. The reaction products are sent to a sludge settler/clarifier tank 11 where the gypsum precipitates out and is collected. Sludge refers to the wet precipitant. The clarified liquid overflow or supernatant is sent to a CaCO3 reaction tank 12.

Gypsum precipitation is best done at the maximum sulfate concentration possible. This requires that the RO stages be optimized to obtain the maximum level of sulfate possible consistent with proper operation of the RO system. Seeding the reaction solution with gypsum particles is preferred to obtain higher removal efficiency. Seed concentration added to aid precipitation will vary depending on conditions such as sulfate concentration, time required by other process scheduling requirements and other conditions. Preferred seed concentrations are between about 0.4% to about 3%. Precipitation is also termed sedimentation, desaturation, or thickening.

The $CaCl_2$ and RO retentate are added to a tank or other holding volume 10. The rates of addition of the two streams are controlled to maintain an excess of calcium in order to increase sulfate precipitation. Preferably the $CACl_2$ feed is homogenized before addition. In the tank a standard propeller mixer or other driven mixer may be used. Other methods such as pumped recirculation or bubble aeration may be appropriate in some circumstances. After an initial startup time, the tank may operate as a constant stirred tank reactor with an overflow or pumped output approximately equal to the input flow. A practitioner has the options of several modes of operation relative to the degree of precipitate formation. Precipitation by nucleation and growth of the particles occurs after initial mixing. In the holding tank the particles will attain an average size depending on such effects as the average retention time in the tank, mixing conditions, and the concentrations of the various species. From 10 flow goes to a settler/clarifier tank 11, such as a cylindrical tank with a conical bottom and an outlet valve at the bottom.

The holding tank volume and the rate of inflows will control the average retention, i.e., reaction time and thereby, average particle size. The practitioner has the choice of using a relatively small tank and sending smaller particles to the settling tank, or of using a larger volume reactor and having the ability to send larger particles to the settler. In the former case, less capital may be required for the holding tank, and sludge formation will be reduced. In the latter case, sludge deposition and therefore removal will be accelerated. The sludge of calcium sulfate and other materials settles to the bottom of the conical bottom and is removed as necessary by a sludge pump or by intermittent opening of a tank bottom valve. In some larger processes, it may be necessary to physically scoop the settled sludge out.

The gypsum or sulfate precipitate process stream is formed by gravity settling. Gravitational settling is a simple method of sludge removal. Other methods are available, depending of local requirements. Settling rate may be increased by using flocculating agents. Cationic, anionic or non-ionic flocculants may be used. Acrylamide polymers, polyaminoacrylate polymers and sulphonated polystyrene are among the types of flocculants typically used.

Filtration may also be used to dewater and concentrate the sludge. This would be effective, for example, in cases where the precipitated solids have commercial value, or where there is limited solids holding space. Standard methods of filtration, such as leaf filtration, rotary drum filtration, rotary disk filtration, horizontal belt or horizontal table filtration. These and other methods are described in standard texts, for example; Perry's Handbook $7^{th}$ Edition (McGraw-Hill N.Y.).

The overflow from Tank 11 goes to Tank 12 for the first step in $CaCO_3$ precipitation. This step removes a large proportion of the calcium present at this point in the process, preferably greater than about 50%. The overflow is mixed with a carbonate salt having a monovalent cation from a source here shown as holding tank 18. Sodium carbonate (Na2CO3; also known as soda ash) is a preferred carbonate salt. The mixed solution is overflowed or pumped to a settling/clarifying tank. Operation of this process is similar to the gypsum precipitation process previously described and the same considerations obtain.

The carbonate precipitation process has an added benefit. Trace metals are captured by the SAC ion exchange and released during regeneration. The carbonate step captures a high proportion of many of them. Operators of the sulfate removal process being described here may want separate this sludge from the gypsum sludge.

The overflow from the carbonate precipitation step contains sodium chloride. The chloride ion entering primarily from the calcium chloride regenerant and sodium ion from the $Na_2SO_4$ brine and the $Na_2CO_3$ added in the carbonate precipitation. This will be used to regenerate the SAC ion exchange columns.

In order to attain the concentration necessary, the overflow is sent to a RO system 14, 15. The feed may be prefiltered to remove fines and other foulants or scaling compounds. Due to the high salt concentration and the requirement to concentrate further, a seawater reverse osmosis membrane is preferred.

The overflow from 13 is sent to RO feed tank 14. There may be a prefiltration system prior to tank [14] or prior to the RO system. As needed, the RO system 15 will be operated to concentrate the sodium chloride. Recovery concentration is determined by the requirement for regeneration. Preferred NaCl concentrations are from about 5% to about 10%, although higher concentrations may be required in cases requiring very rapid or high percentages of regeneration. The concentrated NaCl (brine) is sent to a holding tank 16 until needed. Acid may be added to the NaCl brine to adjust ph.

SAC regeneration is required when a softener cartridge is substantially saturated with multivalent cations, and effectively ceases to remove MVC. In practice, regeneration is done before SAC effectiveness is reduced sufficiently to affect the RO system. Regeneration is done by flooding the SAC with salts having a monovalent cation. The concentration is high enough to force removal of bound MVC. Salt, i.e., sodium chloride regeneration is preferred. Sodium chloride regeneration is preferred in lieu of acid regeneration because salt regeneration eliminates the need for acid storage and additional equipment and neutralization post regeneration.

An integrated process, such as described above, where material produced in more than one step are used in at least one other process step, requires coordination of production so that the overall process works effectively. It can be seen that the process of sulfate removal described here is more than a series of independent process steps, operating so as to simply take input from the previous step, conduct a process step and send material to the next step. In the process described above product stream from the ion exchange regeneration is combined with stream from sulfate concentration to cause sulfate precipitation, and the effluent is used to make regenerant for the ion exchange. One way to look at the process is as sodium ion recycle acting on the inlet feed stream.

In order for the overall process to operate effectively and continuously, the process steps and their product streams have to be controlled and balanced so that none fail or fall behind its requirements to supply a succeeding step. Examples include the following:

The calcium sorption step removes calcium ion to protect the RO system from scaling and also to be a supply of calcium chloride for later gypsum precipitation. The ion exchange of this step provides sodium to the process stream and the sodium eventually returns to regenerate the ion exchange columns.

To regenerate the columns, the amount of sodium has to be high enough, about 5% to about 10%, to remove bound calcium at a rate and percent removal that the column can be reused when required. To attain this amount, the RO systems have to be able to concentrate the sodium to the desired amount without scaling, fouling, or other loss of productivity. The calcium chloride exchanged in regeneration has to be at a high enough concentration to effect a high level of precipitation in the gypsum removal step. This requires controlling the regeneration so that the output stays above about 4000 mg/L.

In the gypsum precipitation step, the input Na2CO3 also has to be at a high enough concentration to effect a high level of precipitation. To obtain this, the RO system has to be operated so that this concentration is maintained at the high level required without scaling, etc.

It can be seen that if a step operates outside of the desired state, that the rest of the process will start to deteriorate as the feed-back of poor operation takes hold. For this reason, the process is considered as a whole, and not a series of independent processes.

In the process and apparatus described, the steps are fluidly connected. The process fluid passes or is transported from one step or piece of equipment to the next step or equipment through piping, channels or other conduits. There may be holding or surge tanks, or other containers between the start and end point of the connection.

It will be apparent to those skilled in the art of waste water remediation, treatment, and disposal that the conditions required to remove sulfate and associated species from a waste stream will depend on the specific water being considered and the parameters (size, specific equipment chosen for each step, etc.) of the apparatus used. The description given and the examples described are meant to be guidelines for those skilled in the art, and are not meant to be limiting in any manner.

Examples

A series of laboratory studies were undertaken of the steps individually, followed by a pilot scale operation of the integrated process. The object of these studies was to develop a basis for a process and apparatus to remove sulfate from an AMD site. The laboratory studies were done to develop data for the pilot operation. These examples are shown to illustrate the general technology, and are not to be taken as a limit to the technology described in this document.

Laboratory Studies
Ion Exchange Studies

Ion exchange studies were carried out using strong acid cation exchange resin (Purolite, CT100E). The resin was packed in a lab column (25 mm ID×150 mm L), with ~72 ml of empty bed contact volume. Calcium feed solution, similar to AMD feed (~750 mg/l of Ca and ~2000 mg/l of $SO_4$) was passed through the column via a peristaltic pump at the flow rate of 12 ml min−1 (⅙ bed volume per minute). The column effluent was collected at regular intervals and analyzed for Ca content. The experiment was continued until calcium breakthrough (Ca>4 mg/l). After regeneration (discussed separately), the experiments were repeated for two more cycles. The results are graphically presented in FIG. 3a.

Figure 3A:
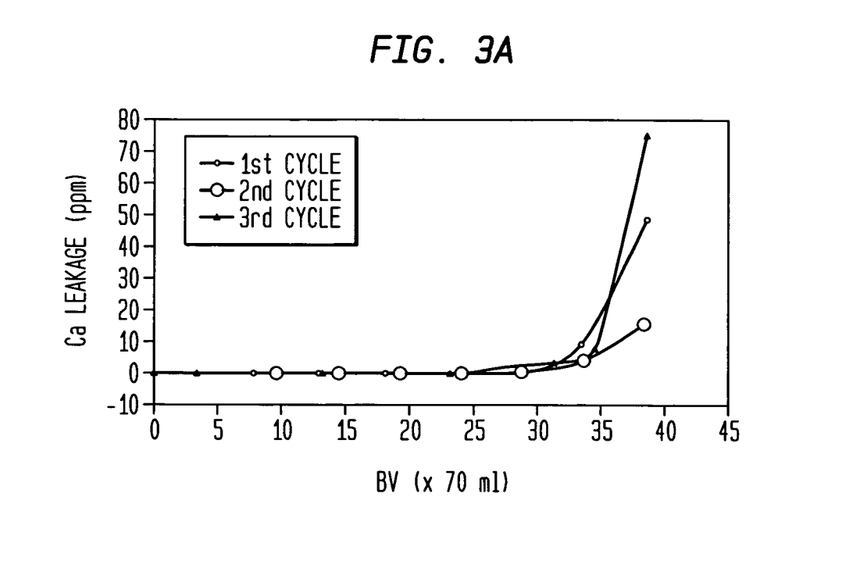
FIG. 3a shows the results of a test for calcium removal by strong acid cation ion exchange.

As seen in FIG. 3a, the time to exhaustion is comparable over three different load-regenerate cycles. Based on the results, the capacity is been calculated to be in the range of 1.3-1.4 eq/l for this application.

Ion Exchange Regeneration

Figure 3B:
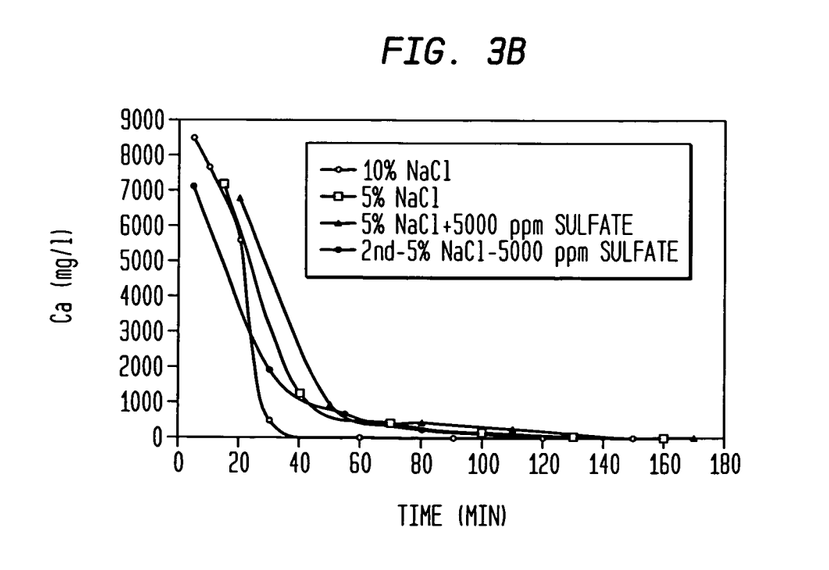
FIG. 3b shows the effect of SAC regeneration with various regenerants.

Sodium chloride regeneration of exhausted ion exchange column was conducted in a counter current flow. A regenerating solution of 10% NaCl was used for the first regeneration and subsequent cycles were done with 5% NaCl followed by 5% NaCl containing 5000 ppm of sulfate (simulating RO concentrate). In all three cases, a peristaltic pump passed regenerant solution through the column at the flow rate of 12 ml/min, (0.16 Bed Volumes per minute). The spent regenerant was collected at regular intervals and tested for calcium content. The results are graphically presented in FIG. 3b.

The 10% NaCl solution regenerates faster than a 5% NaCl solution. Based on these results, the RO concentrate should be controlled to about approximately greater than 5% to balance regeneration rate with RO recovery. Sulfate in the regenerant did not affect the regeneration and no $CaSO_4$ precipitation or scaling was observed over three cycles. In order to maintain 4000-5000 mg/l of calcium in spent regenerant to operate the gypsum precipitation effectively, regeneration should be concluded when the effluent concentration of the spent regenerant is about ~1000 mg/l calcium or greater. This will prevent excessive dilution of the calcium chloride stream for use in the gypsum precipitation step. Regeneration to approximately 80-90% capacity is an example of a way to balance the requirements for both steps.

Calcium Sulfate Desaturation

Figure 4:
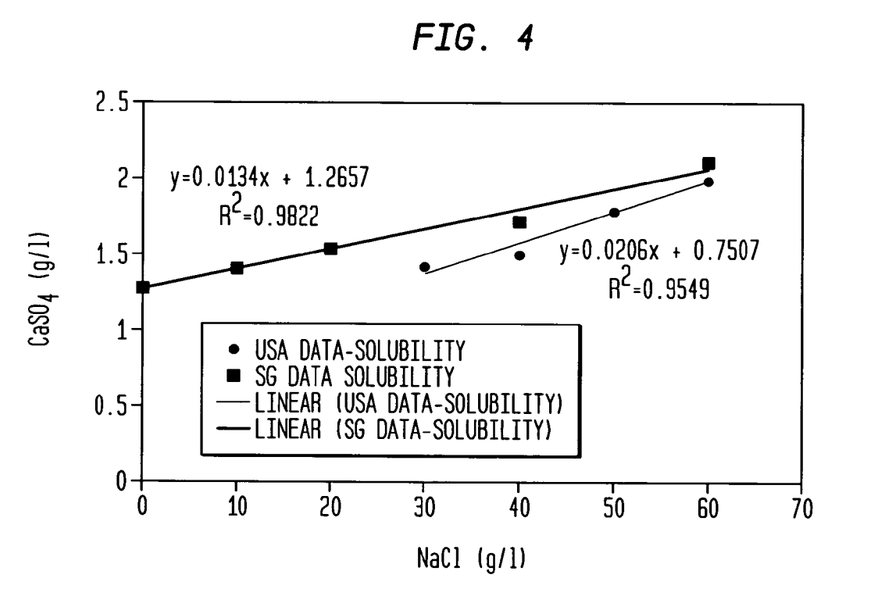
FIG. 4 illustrates CaSO4 desaturation tests conducted under different sodium chloride concentrations.

Gypsum ($CaSO_4$) desaturation (precipitation) was evaluated with different added concentrations of sodium chloride to determine gypsum solubility. The experiment was conducted by the addition of 15 ml of 20% $Na_2SO_4$ solution to 100 ml of 5000 mg/l Ca solutions containing 0, 1, 2, 4 & 6% NaCl, respectively. The mixture was then seeded with 0.5 g of precipitated $CaSO_4$ (solid particles) and stirred for 2 minutes. The solution was settled for 2 hours, filtered through a 0.45 micron filter and analyzed for Ca. The relationship of $CaSO_4$ solubility versus NaCl concentration is shown in FIG. 4. Testing conducted previously in another location is also included for purpose of comparison. The two data sets are comparable in value with a slight slope difference.

Another set of experiments was carried out to examine gypsum solubility using a more dilute $Na_2SO_4$ concentration under different NaCl concentrations. The sulfate concentration chosen in this experiment was based upon projections of SWRO1 reject to mimic the actual process conditions. In this experiment, 100 ml of 5000 mg/l Ca Solution was mixed with 100 ml of 1% (10,000 mg/l) $SO_4$, as sulfate, and seeded with 0.5 g $CaSO_4$ (solid). The supernatant solution was analyzed for Ca content after settling and filtration through 0.45 micron filter. The same experiment was repeated using four different NaCl concentrations (1, 2, 4 & 6%). The results from these experiments are presented along with the results of previous experiments (20% $Na_2SO_4$ addition) in Table 1.

TABLE 1

Gypsum precipitation under different NaCl concentrations and effect of diluted Sulfate concentration.

| % NaCl added | Initial SO4 in solution (mg/l) | Initial Ca in solution (mg/l) | Final Ca in solution after filtration (mg/l) | % Removal |
|---|---|---|---|---|
| 0 | 5000 | 2500 | 1653 | 34 |
| 0 | 17577 | 4347 | 1280 | 70 |
| 1 | 5000 | 2500 | 1760 | 30 |
| 1 | 17577 | 4347 | 1408 | 68 |
| 2 | 5000 | 2500 | 1813 | 28 |
| 2 | 17577 | 4347 | 1536 | 65 |
| 4 | 5000 | 2500 | 2080 | 17 |
| 4 | 17577 | 4347 | 1728 | 60 |
| 6 | 5000 | 2500 | 2240 | 10 |
| 6 | 17577 | 4347 | 2112 | 47 |

Gypsum precipitation was substantially lower when less sulfate was present. The effect of the common ion sodium is to reduce the effectiveness of precipitation. The best operational performance of the system would be when the sulfate concentration in SWRO1 reject is maximized.

The effect of seeding in gypsum desaturation was examined by undertaking the precipitation with and without gypsum seeding (as solid $CaSO_4$). The results are presented in Table 2 which clearly demonstrates that the seeding increases the amount of gypsum precipitated.

TABLE 2

Effect of seeding on gypsum precipitation

| NaCl (5) | Seeding with 0.5 g $CaSO_4$ (solid) | Initial Ca in solution (mg/l) | Final Ca in solution after filtration (mg/l) | % Removal |
|---|---|---|---|---|
| 0 | No | 2500 | 2096 | 17 |
| 0 | Yes | 2500 | 1653 | 34 |
| 1 | No | 2500 | | |
| 1 | Yes | 2500 | | |
| 2 | No | 2500 | 2480 | 0.8 |
| 2 | Yes | 2500 | 1813 | 28 |

$CaCO_3$ Precipitation

A simulated gypsum precipitation effluent which contained 2500 mg/l of Ca and 4000 mg/l SO4 was utilized in the $CaCO_3$ precipitate experiments. A 100 ml sample of this solution containing different amounts of NaCl (0-6%) was transferred into a 250 ml beaker. To this, 20 ml of 10% $Na_2CO_3$ solution was added, stirred and then allowed to settle. Two sets of these experiments were performed. One set was seeded with 0.5 g $CaCO_3$ and the other performed without seeding. After settling and filtration, the filtrate solution was analyzed for Ca content. The results are presented in Table 3. Ca removal by $CaCO_3$ is very effective. CaSO+ seeding appears to be less of a requirement in this step compared to gypsum precipitation as we achieved 100% in all test conditions. The presence of up to 6% NaCl in the mixture did not affect the CaCO+ removal in this test series.

TABLE 3

| % NaCl Added | Without seeding; Ca remaining in solution | % Removal | With seeding; Ca remaining in solution | % Removal |
|---|---|---|---|---|
| 0 | 0 | 100 | 0 | 100 |
| 1 | 0 | 100 | 0 | 100 |
| 2 | 0 | 100 | 0 | 100 |
| 4 | 0 | 100 | 0 | 100 |
| 6 | 0 | 100 | 0 | 100 |

The residual sulfate in $CaCO_3$ precipitation effluent was in the range 3000-3300 mg/l as sulfate. These results suggest that most of the Ca has been removed as $CaCO_3$.

Dosage of $Na_2CO_3$

A study was undertaken to examine the effect of the dosage of the carbonate to the removal efficiency of the Calcium. Specific volumes of a 5% $Na_2CO_3$ solution were added to 100 ml of 2500 mg l-1 (~5.66 mM) of a calcium bearing solution and seeded with 0.5 g $CaCO_3$. After sedimentation, the supernatant solution was filtered and analyzed for calcium. The results are presented in Table 4. The soda ash concentration was found to be between 0.83:1 to 1.2:1 (molar ratio) in order to achieve 100% removal. This amount can be adjusted depending on site and system requirements.

TABLE 4

Na2CO3 dosage study

| Ca concentration (mM) | CO3 concentration (mM) | CO3:Ca Molar ratio | Residual Ca in solution |
|---|---|---|---|
| 5.66 | 2.35 | .412 | 938 |
| 5.66 | 4.7 | .830 | 134 |
| 5.66 | 7.1 | 1.254 | 0 |
| 5.66 | 9.4 | 1.678 | 0 |
| 5.66 | 14.1 | 2.491 | 0 |

Trace Contaminants in Ion Exchange Studies

Typical trace metal contaminants were added to the ion exchange feed to simulate an AMD feed after a lime treatment. The purpose of this experiment was to observe the effects these trace contaminants had upon the ion exchange operation and performance. Samples of the effluent of the ion exchange process were drawn at two time intervals and analyzed. After exhaustion, the ion exchange resin was regenerated. The spent regenerant was also analyzed for these trace contaminants. The results of the control, ion exchange effluent and spent regenerant are presented in Table 5.

TABLE 5

Trace contaminants analysis during ion exchange process (mg/l).

| Trace Elements | Feed(Synthetic waste) Mg/l | Ion exchange effluent (After 60 minutes) | Ion exchange effluent (After 150 minutes) | Spent Regenerant (After 30 minutes) | Spent Regenerant (After 90 minutes) |
|---|---|---|---|---|---|
| Ca | 804 | 0 | 0 | 7350 | 1290 |
| Al | 2023 | 0.036 | 0.024 | 18.0 | 0.459 |
| Ba | 0.75 | 0.005 | <0.004 | 2.06 | 0.014 |
| B | 0.926 | 0.910 | 0.937 | 0.076 | 0.014 |
| Cu | 0.583 | <0.002 | 0.003 | 4.75 | 0.031 |
| Fe | 4.76 | 0.031 | 0.024 | 3025 | 0.009 |
| Pb | 0.537 | <0.001 | <0.001 | 3057 | <0.001 |
| Mg | 10.9 | <0.027 | <0.027 | 118 | 0.340 |
| Mo | 2.21 | 0.391 | 0.482 | 0.495 | 0.141 |
| Ni | 0.522 | 0.004 | 0.006 | 3.83 | 0.06 |
| Zn | 0.2 | <0.004 | <0.004 | 1.49 | 0.009 |

From the results in Table 5, it can be seen the majority of the trace contaminants are retained by the SAC ion exchange resin. Only Boron was not exchanged to at least some extent. Molybdenum is reduced by 75% in a 2.2 ppm feed concentration. Trace contaminants appear to be eluted from the column during regeneration to a large extent.

Trace Contaminants in $CaSO_4$ Precipitation Process

Ca (~5000 mg/l) solutions were spiked with 2 ppm and 5 ppm levels of Mo, Ni, Al, B and mixed with equal amount of sulfate solution (~10000 mg/l). This was completed with five different NaCl concentrations and seeded with $CaSO_4$.

Analysis, after settling and filtration, by Inductively Coupled Plasma (ICP) AA was completed. The results are presented in Table 6.

From Table 6, calcium precipitation may be slightly affected with increasing amounts of trace contaminants, particularly in the presence of higher amounts of sodium chloride. However, the differences in residual Ca may be within experimental error, as residual in the spiked does not always correlate with the amount of trace contaminants.

TABLE 6

Ca precipitations in the presence of trace contaminants

| % NaCl | Ca(ppm) in supernatant (no trace contaminants) Table L2 | Ca(ppm) in supernatant(spiked with ~2 ppm Mo, Ni, Al, B) | Ca(ppm) in supernatant(spiked with ~5 ppm Mo, Ni, Al, B) |
|---|---|---|---|
| 0 | 1653 | 1824 | 1450 |
| 1 | 1760 | 2304 | 1580 |
| 2 | 1813 | 2016 | 1900 |
| 4 | 2080 | 2208 | 2440 |
| 6 | 2240 | 2208 | 2600 |

Barium and lead are removed in the gypsum precipitation step.

Trace Contaminants in $CaCO_3$ Precipitation Process

Co-precipitating trace contaminants in the $CaCO_3$ precipitation step was investigated by adding these contaminants into Ca solutions at various levels before precipitation. A solution of 15 ml of 5% $Na_2CO_3$ was added to these mixtures prepared at different NaCl concentrations. All solutions were seeded with 0.5 g of $CaCO_3$ and allowed to settle for 2 h. The supernatant solutions were filtered and analyzed for trace contaminants by ICP and Ca by titration. Residual Ca content of less than 3 mg/l was found in all cases. The trace metals residual data are presented in Table 7.

These results show that Ni is removed completely (Set II) when it is added with a few trace contaminants. However it is not completely removed in the presence of other trace contaminants (Set III & IV).

Depending on the amount of trace metal contaminants, it may be necessary to rinse the ion exchange occasionally with acid to fully recover capacity. Acid rinse can be collected and put together with sludge for disposal, or disposed of separately.

TABLE 7

ICP analysis data of CaCO3 precipitation with added trace contaminants

| | Set I<br>MO(10 mg/l) &<br>Mg(50 mg/l)<br>4% NaCl | | Set II<br>Mo, Ni, Al, B<br>(10 mg/l) &<br>Mg(40 mg/l)<br>4% Nacl | | Set III<br>11 elements<br>(20 mg/l)<br>4% NaCl | | Set IV<br>7 elements<br>(30 mg/l)<br>2% NaCl | |
|---|---|---|---|---|---|---|---|---|
| | before | after | before | after | before | after | before | after |
| Ca | 2265 | 0.5 | 2265 | 2 | 1970 | 0.4 | | |
| Al | | | 11.0 | 1.6 | 22 | 0.7 | 36.5 | 0.4 |
| B | | | 12.0 | 6.94 | 18.7 | 14.8 | 30.4 | 15.0 |
| Cu | | | | | 22.4 | 14.1 | 37.2 | 12.3 |
| Fe | | | | | 8 | 0.2 | 14.8 | 0.6 |
| Mg | 54 | 0.5 | 40 | 0.2 | 54 | 0.03 | | |
| Mo | 9.0 | 5.8 | 10 | 5.7 | 8.0 | 3.7 | 28.1 | 4.4 |
| Ni | | | 11 | 0.1 | 17.8 | 13.7 | 31.4 | 13.6 |
| Zn | | | | | 21.4 | 9.9 | 34.7 | 8.3 |
| Pb | | | | | 14.9 | 0.03 | | |
| Mn | | | | | 20 | 2.3 | | |

Pilot Plant Operation

One way to consider the apparatus that is described below is as a "black box" into which the feed stream enters and to which is added $Na_2CO_3$ and acid. The output is purified water, and gypsum and $CaCO_3$ sludge. The apparatus (i.e., black box) transforms the feed and internally generates materials needed to conduct the transformation and regenerate the multivalent cation removal system. In simple terms, there are three interacting loops that the apparatus operates. Calcium enters with the feed and a large portion is removed by the softeners. This calcium is later removed from the softeners by sodium chloride generated in the calcium carbonate precipitation step, and recombined with concentrated sulfate to precipitate as gypsum ($CaSO_4$), and then with soda ash ($NaCO_3$) to precipitate as calcium carbonate ($CaCO_3$). In the sulfate loop, the sulfate flows through the softeners and is concentrated in the initial RO system and recombined with calcium to precipitate gypsum. The added soda ash then completes calcium precipitation. The soda ash loop consists of adding the soda ash to the calcium loop, where sodium chloride results from the $CaCO_3$ precipitation, followed by concentration in the second RO system. The concentrated brine may be pH adjusted with acid. It is then used to regenerate calcium saturated softeners. Regeneration frees bound calcium to enter the calcium loop.

The purpose of this brief explanation is to show that the apparatus is not an assemblage of parts, but an integral and interacting whole, and has to be considered as such. The description of a working pilot plant that follows will illustrate the necessity of these interactions.

A 4 liter per minute pilot system was constructed and run to develop steady state operating parameters for a full scale plant. The feed was modeled after a lime treated mine AMD stream. The following is an example feed stream composition:

| Specie | Concentration<br>(ppm) |
|---|---|
| Fe | 406 |
| Ni | 0.4 |
| MO | 4.9 |
| B | 1.2 |
| Al | 2.3 |
| Cu | 0.5 |
| Pb | 0.3 |
| Ba | 0.8 |
| Mg | 11.1 |
| Zn | 0.3 |
| Mn | 0.5 |
| Ca | 787 |
| Na | 1282 |
| K | 22 |
| SO4 | 2660 |

The pilot system was generally arranged as described previously and as shown in FIG. 5 shows the layout and data from the last week of operation. The present description will follow the feed stream from the feed tank through ion exchanger regeneration and point out the interactions of the several steps.

Figure 5:
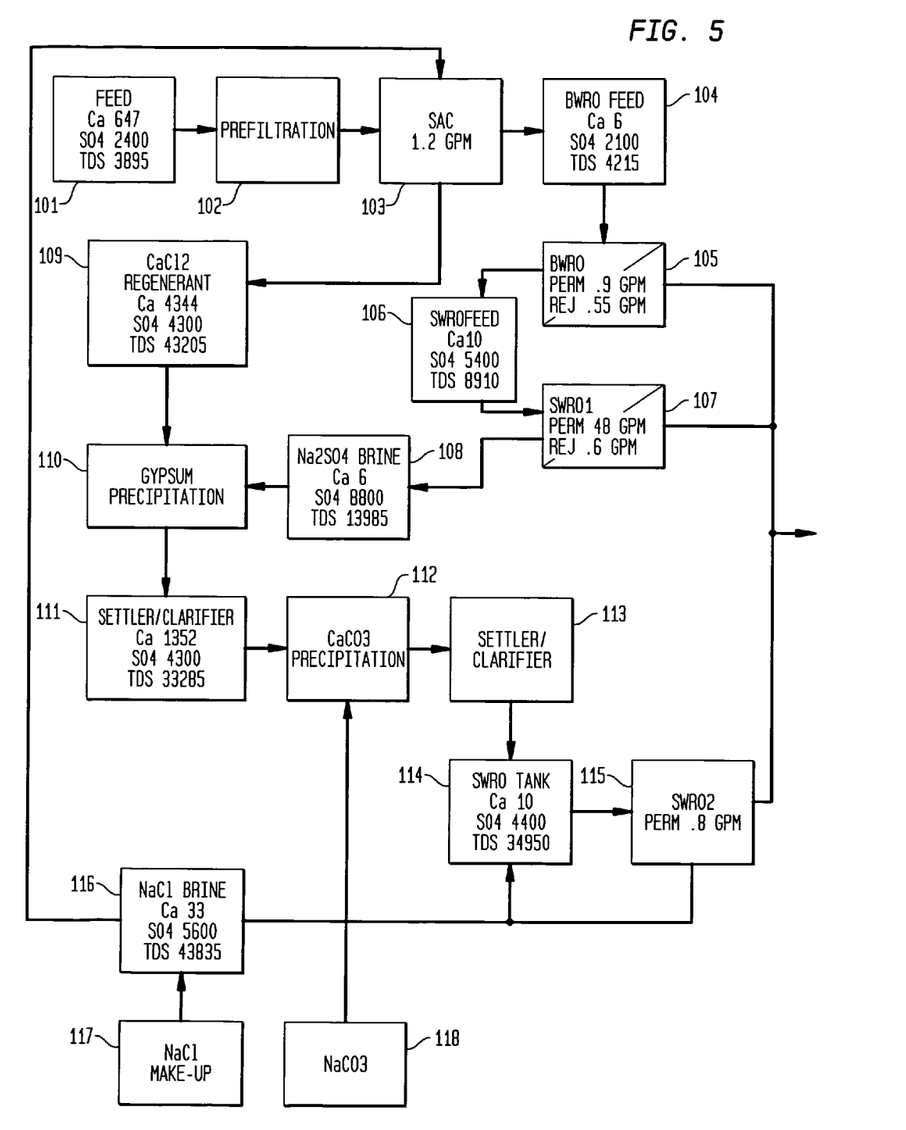
FIG. 5 shows the process layout for the pilot process.

Feed enters the system from tank 101 to two strong acid ion exchange cartridges (softeners) arranged in series 102. Softener positions were labeled S1 and S2. If the Ca level of the effluent from the softeners were found above 10 mg/l, S1 was replaced by S2 and a new or regenerated softener placed in position S2. In this way calcium concentrations could be controlled to under 20 mg/l. This allowed operation of the RO units BWRO 105 and SWRO1 107 with no pretreatment to prevent calcium scaling.

Brine collected from SWRO2 115 was used to regenerate the softeners. SWRO 2 operation will be discussed below. Typically, four bed volumes of 5% NaCl were flowed at a rate of approximately 1.3 gallons per minute (4.9 liters/min). Typically, about 90% of calcium bound to the softeners would be removed. The collected calcium concentration would be about 4000-5000 mg/l for the total regeneration. This concentration was found useful for gypsum precipitation. If calcium in the spent, i.e., effluent regenerant were below approximately 2000 mg/l, regeneration would be stopped. Regeneration was done on a separate regeneration stand.

The softened feed was sent to the sulfate concentrating RO system, BWRO 105 and SWRO1 107. In this pilot operation, a primary and secondary reject staged RO was used. The primary system, BWRO, concentrates the feed and sends about 40% of the feed stream as concentrate to SWRO1, where the feed stream is further concentrated. Calcium and sulfate are almost completely rejected (>99% rejection) and sent via the SWRO1 concentrate stream to the $SO_4$ brine tank [108] for combination with the spent calcium chloride regenerant from the softeners to precipitate gypsum.

In the pilot system, BWRO was operated at 200-250 psi (1380-1724 KPa). SWRO1 was operated at about 250 psi (1724 KPa). The total Concentration Factor for the two systems, defined as Reject concentration to Feed Concentration is 8800/2100=4.2.

Permeate quality was monitored for acceptable levels. The average TDS (Total Dissolved Solids) of BWRO was typically about 110 mg/l and for SWRO1 about 250 mg/l. SWRO2 was operated intermittently, and had permeates containing 300-400 mg/l. Calcium levels in all three permeates was generally less than 2 mg/l, and sulfate was in the range of 5-7 mg/l. BWRO permeate was observed to have less than 5 mg/l calcium in most cases.

Recovery, is defined as (F−R)/F where;
F=Feed flow rate to RO system
R=Reject stream flow rate Recovery is the proportion of the feed that permeates and in this process may be sent to streams or water sources.

Example recoveries were calculated in this case as

BWRO 0.9/1.48=0.62

SWRO1 0.48/1.08=0.44

In the pilot plant, the reject from BWRO is sent to a tank, [106], for accumulation before processing in SWRO1. This allows better control over cross membrane flow and operational pressure in SWRO1. Operating with an accumulation tank restricts calculation of an overall flow recovery. It is not possible to calculate the combined recovery because of the staged process, but an estimate is 0.62+(1−0.62)0.44=0.79

Higher pressure operation would be expected to increase recovery.

In larger systems, it may be possible to run a directly connected reject staged process and reduce energy requirements by using the high pressure reject stream of the first stage (or any previous stage) as feed to the next stage or to the pumping system of the next stage.

The reject stream from SWRO1 is combined in Tank 110 with the calcium chloride in the spent regenerant stored in Tank [109]. It is then sent to the Clarifier 111. The sulfate concentration in SWRO1 reject stream was approximately 4300-4800 mg/l in normal operation. The sulfate content is reduced to about 50% of the incoming concentration in 111. Based on laboratory studies, a higher sulfate level would improve precipitation, but might increase the potential for scaling, which would deleteriously affect overall operations. Higher levels of calcium chloride would also increase sulfate removal, but supersaturation may occur, decreasing effectiveness.

$CaCl_2$ was added to make up the spent regenerant to keep the calcium level above 4000 mg/l. Subsequently, it was found that homogenizing the spent regenerant before this was added to the process resulted in a better performance of the gypsum reaction and the calcium concentrations were between 1400-1600 mg/l.

The calcium level in Tank [114] was less than 25 mg/l once steady state operation was reached
and residual calcium was in the range of 3-10 mg/l during the last week of operation. During this time, excess soda ash was added to reduce the 'Ca' below 10 mg/l in order to avoid calcium sulfate scaling during recirculation and concentration through SWRO2. However, addition of excess soda ash would increase the cost due to the need for additional acid for pH adjustment in the NaCl brine tank 116.

In the case of SWRO2 115 feed, the initial targets were just to maintain the calcium below 100 mg/l and adjust solution pH less than 7.2. However, it was later decided to bring down calcium level as low as possible since there is a need to recirculate the reject to increase brine (NaCl) concentration. Excess addition of soda ash ($NaCO_3$) would increase costs due to HCl cost. The soda ash was added to keep the calcium level around 10 mg/l. Operation of SWRO2 without pretreatment was possible with the calcium level below about 20 mg/l.

SWRO2 was operated intermittently based on the availability of treated water from Tank T11. This system was designed to achieve 25% recovery with a feed TDS of 35000 mg/l and at an operating pressure of 850 psig. However, the pilot was able to achieve 40% recovery during the initial startup period when the salt content is low. In order to increase the salt concentration, the reject stream was recirculated through the system until the maximum operating pressure of 850 psig was reached.

Brine produced from SWRO2 was sent to Tank 116. Additional NaCl was added as needed and pH was adjusted with HCL or other acid. Tank 116 supplied regenerant for softener regeneration.

What is claimed is:

1. An integrated sulfate removal process for a contaminated water source, the process comprising:
    passing a feed stream containing contaminated water comprising at least sulfate and at least a multivalent cation through sorption media to reduce an amount of multivalent cations in the feed stream by sorption of at least a portion of the multivalent cations by the sorption media and to form a passed stream;
    separating said passed stream into a purified water stream and a concentrated sulfate stream;
    separating said concentrated sulfate stream into precipitated sulfate stream and a first supernatant stream;
    separating said first supernatant stream into a precipitated multivalent cations stream and a second supernatant stream;
    preparing a sorption media regenerant from said second supernatant stream; and
    regenerating said sorption media with the regenerant to remove an amount of the multivalent cations from the sorption media and provide regenerated media and spent regenerant.

2. The process of claim 1 wherein the contaminated water source is pretreated acid mine drainage.

3. The process of claim 1 wherein the sorption media is a strong acid cation exchanger.

4. The process of claim 1 wherein said passed stream is separated with a reverse osmosis membrane.

5. The process of claim 4 wherein the reverse osmosis system comprises at least two stages, wherein a concentrate stream of a previous stage is used as a feed stream of a following stage.

6. The process of claim 1 wherein separation of said concentrated sulfate stream results from combining said concentrated sulfate stream and said spent regenerant.

7. The process of claim 6 wherein greater than about 50% of entering sulfate content is removed as a precipitated sulfate stream.

8. The process of claim 6 wherein separation of said concentrated sulfate stream results from precipitating sulfate as gypsum.

9. The process of claim 1 wherein the separation of said multivalent cations results from combining said first supernatant stream with a carbonate salt having a monovalent cation.

10. The process of claim 9 wherein the separation of said multivalent cations results from combining said first supernatant stream with sodium carbonate.

11. The process of claim 1 wherein the sorption media regenerating stream is prepared by concentrating the second supernatant stream.

12. The process of claim 11 wherein the sorption media regenerating stream is prepared by concentrating the second supernatant stream with a reverse osmosis membrane.

13. The process of claim 1 wherein the permeates of all reverse osmosis stages has a combined sulfate content of less than about 250 mg/l.

14. The process of claim 3 wherein a reverse osmosis membrane separates the passed stream into a purified water stream and a concentrated sulfate stream.

15. The process of claim 14 wherein separation of said concentrated sulfate stream results from combining said concentrated sulfate stream and said spent regenerant.

16. The process of claim 15 wherein the separation of said multivalent cations results from combining said first supernatant stream with a carbonate salt having a monovalent cation.

17. The process of claim 16 wherein the sorption media regenerating stream is prepared by concentrating the second supernatant stream with a reverse osmosis membrane.

18. The process of claim 17 wherein said sorption media is contacted with the regenerant to provide regenerated media and spent regenerant.

19. An integrated process for removing sulfate from a contaminated water source, the process comprising:

passing a feed stream comprising at least sulfate and at least a multivalent cation through a strong acid cation ion exchange media to reduce an amount of multivalent cations in the feed stream by sorption of at least a portion of the multivalent cations by the strong acid cation exchange media and to produce a passed stream having substantially no scaling potential when concentrated in a following membrane separation process step;

separating the passed stream exiting the strong acid cation ion exchange media with a membrane system to produce a reduced sulfate content permeate and a concentrated sulfate stream;

combining the concentrated sulfate stream with the spent regenerant to produce a precipitated sulfate stream and a sulfate clarified overflow stream;

adding a carbonate salt with a monovalent cation to the sulfate clarified overflow stream to produce a precipitated multivalent cations stream and a clarified multivalent cations overflow stream; and concentrating the clarified multivalent cations overflow stream with a membrane to produce the regenerant for the strong acid cation exchange media, and a permeate.

20. The process of claim 19 wherein the contaminated water source is pretreated acid mine drainage.

21. The process of claim 19 wherein the strong acid cation ion exchange media comprises polystyrene crosslinked with divinylbenzene having sulfonic groups attached.

22. The process of claim 21 wherein the sulfonic groups comprise sodium, potassium, lithium or hydrogen as counter ion, or combinations thereof.

23. The process of claim 19 wherein the membrane system comprises a reverse osmosis membrane system.

24. The process of claim 23 wherein the reverse osmosis system comprises at least two stages, wherein a concentrate stream of a previous stage is used as a feed stream for a following stage.

25. The process of claim 19 wherein the permeates of all reverse osmosis stages has a combined sulfate content of less than about 250 mg/l.

26. The process of claim 19 wherein separation of said concentrated sulfate stream results from precipitating sulfate as gypsum.

27. The process of claim 19 wherein greater than about 50% of entering sulfate content is removed as a precipitated sulfate stream.

28. The process of claim 19 wherein the precipitation of said multivalent cations results from contact with a sodium carbonate.

29. The process of claim 19 wherein the precipitation of said multivalent cations reduces sulfate content to below about 100 mg/l in the multivalent cations overflow stream.

30. The process of claim 19 wherein the precipitation of said multivalent cations reduces sulfate content to below about 20 mg/l in the multivalent cations overflow stream.

31. The process of claim 19 wherein the strong acid cation ion exchange media is regenerated to greater than 80% of original capacity.

* * * * *